(12) United States Patent
Tatizawa et al.

(10) Patent No.: US 9,193,808 B2
(45) Date of Patent: Nov. 24, 2015

(54) CATALYST AND PROCESS FOR OBTAINING CATALYST OF HIGH ACTIVITY

(75) Inventors: Noemi Tatizawa, Rio de Janeiro (BR); Jaime Correia Da Silva, Rio de Janeiro (BR); Danielle De Carvalho Pinto Freitas, Rio de Janeiro (BR); Katia Simone Zanco Palma, Duque de Caxias (BR); Richard Faraco Amorim, Porto Alegre (BR); Leandro Dos Santos Silveira, Canoas (BR)

(73) Assignee: PETROLEO BRASILEIRO S.A.-PETROBRAS, Rio de Janeiro, RJ (BR)

( * ) Notice: Subject to any disclaimer, the term of this patent is extended or adjusted under 35 U.S.C. 154(b) by 26 days.

(21) Appl. No.: 13/260,058

(22) PCT Filed: Mar. 10, 2010

(86) PCT No.: PCT/BR2010/000064
§ 371 (c)(1),
(2), (4) Date: Sep. 23, 2011

(87) PCT Pub. No.: WO2010/108244
PCT Pub. Date: Sep. 30, 2010

(65) Prior Publication Data
US 2012/0035047 A1 Feb. 9, 2012

(30) Foreign Application Priority Data

Mar. 24, 2009 (BR) .................................... 0900952

(51) Int. Cl.
*B01J 31/00* (2006.01)
*C08F 10/00* (2006.01)
*B01J 21/04* (2006.01)
*B01J 23/02* (2006.01)
*B01J 37/03* (2006.01)
*C08F 110/02* (2006.01)
*C08F 110/06* (2006.01)
*C08F 210/16* (2006.01)

(52) U.S. Cl.
CPC ................ *C08F 10/00* (2013.01); *B01J 21/04* (2013.01); *B01J 23/02* (2013.01); *B01J 37/035* (2013.01); *C08F 110/02* (2013.01); *C08F 110/06* (2013.01); *C08F 210/16* (2013.01)

(58) Field of Classification Search
None
See application file for complete search history.

(56) References Cited

U.S. PATENT DOCUMENTS

| 3,260,738 | A | * | 7/1966 | Fischer et al. | ................. 560/179 |
| 4,021,599 | A | | 5/1977 | Kochhar et al. | |
| 4,378,304 | A | * | 3/1983 | Dombro | ....................... 502/111 |
| 5,244,854 | A | | 9/1993 | Noristi et al. | |
| 5,275,991 | A | * | 1/1994 | Buehler et al. | ................. 502/107 |
| 2005/0014631 | A1 | * | 1/2005 | Balbontin et al. | ............ 502/118 |

FOREIGN PATENT DOCUMENTS

| GB | 2028347 | * | 8/1979 |
| GB | 2 028 347 | A | 3/1980 |
| GB | 2028347 | * | 3/1980 |
| GB | 2 049 709 | A | 12/1980 |
| WO | 97/23518 | A1 | 7/1997 |

OTHER PUBLICATIONS

Alvares, D.R.S. et al, "Catalisadores Ziegler-Natta Suportados em Misturas Alumina/Cloreto de Magnesio para a Sintese de Polietilenos Especiais" 7° Seminario Brasileiro de Catalise, v. 2, pp. 94-105, 1993, pp. 96-97.
International Search Report of PCT/BR2010/000064, dated Jun. 7, 2010.
Alvares et al, "Catalisadores Ziegler-Natta Suportados em Misturas Alumina/Cloreto de Magnesio para a Sintese de Polietilenos Especiais", 7° Seminario Brasileiro de Catalise, 1993, pp. 94-105, V.2.

* cited by examiner

*Primary Examiner* — Bijay Saha
(74) *Attorney, Agent, or Firm* — Sughrue Mion, PLLC

(57) ABSTRACT

The present invention relates to a process for obtaining a catalyst of high activity based on a mixture of supports, more specifically, the mixture of supports being $Al_2O_3$ plus $MgCl_2$, intended for the production of polyolefins. The catalyst of the present invention involves the use of a spherical support based on special alumina that serves as a porous matrix, which is impregnated, by precipitation, with magnesium chloride by dissolving the latter in ethers and/or alcohols.

7 Claims, No Drawings

CATALYST AND PROCESS FOR OBTAINING CATALYST OF HIGH ACTIVITY

FIELD OF THE INVENTION

The present invention relates to the field of catalysts for production of polyolefins, more particularly catalysts of high activity based on a mixture of supports, more specifically a mixture of supports of the $Al_2O_3$ and $MgCl_2$ type.

BACKGROUND OF THE INVENTION

The use of a catalyst on an industrial scale requires that it meets some basic requirements for good operational stability of the polymerization process.

It is already known from the literature that catalysts of polyolefins, having a mechanism of coordination polymerization, faithfully reproduce the original morphology of the catalyst (replication effect).

However, it was observed during the process of development of monofilament fibber based on a particular polyethylene resin, said monofilament possessing special characteristics of high performance and which can be processed in conventional extrusion equipment, that the catalyst displayed considerable difficulties in the implementation of stages that involve large-scale preparation of the polymer. These difficulties mainly occur in relation to the mixed catalyst obtained by grinding, which leads to an irregular morphology.

However, this irregular morphology combined with the high activity of the catalyst leads to an uncontrolled polymerization reaction, when conditions of high partial pressure are used, which in turn is reflected in stages of polymerization and processing of the polymer and leads to problems, mainly owing to formation of agglomerates in the reactor.

The industrial implementation of catalyst based on mixing by grinding, especially for the catalyst of alumina and magnesium, presents a kinetics polymerization of difficult control and, as noted above, the consequence is the formation of agglomerates. This problem makes it difficult to use in continuous processes as its application is only feasible with addition of anti-agglutinant agents. Another way of avoiding these problems is to use smaller charges of monomer. Depending on the "class" of polyethylene desired and on the use of these smaller charges, the commitment of productivity resulting from these measures may make impracticable the industrial implementation of the catalyst. An example of this is the synthesis of a polyethylene fibber "class" where, formation of agglomerates resulting from the extremely high initial activity and the poor morphology resulting from the grinding process, continuous operation of industrial plant becomes impracticable.

Researches continue being developed, searching for a catalyst that displays versatility. A desirable quality in the implementation of an industrial catalyst consists of its capacity for production of different "classes" of products without needing to change the catalytic system, which greatly simplifies operation of the system.

PRIOR ART

The technique that is related to the present invention is directly connected with patent documents that are the property of the applicant, and are briefly mentioned below, merely as reference.

Document PI 80005302-5 (Arnaldo Costa F. Junior et al.) relates to the manner of obtaining an aluminium oxide of high pore volume and large specific surface by calcination of a basic carbonate obtained by reaction of ammonium bicarbonate, ammonium hydroxide and aluminium nitrate or sulphate in aqueous solution in controlled conditions of pH.

Document PI 8005670-9 (Odyr do Couto Filho and Juan Raul Q. Abarca) relates to the preparation of a catalytic system of the Ziegler type supported on alumina possessing increased surface area and high pore volume, said alumina being specially prepared by reaction of an aluminium salt, selected from nitrate and sulphate, with ammonium bicarbonate under controlled conditions of temperature and pH. The catalytic system is employed in the production of ethylene polymers of high density and of molecular weight above 2,000,000. Polymerization is carried out in a suspension of n-hexane or n-heptane in a temperature ranging from 40° C. and 90° C. and a pressure ranging from 10 $kg/cm^2$ to 30 $kg/cm^2$.

Documents PI 8703935 and PI 8801441 A (Juan Raul Q. Abarca and Dellyo Ricardo dos S. Alvares, both documents) describe a process for preparation of a catalyst support based on a specially modified alumina with variable amounts of magnesium chloride, a higher proportion of $MgCl_2$ determining a smaller amount of chains of high molecular weight in the final polymer. The support obtained by combined grinding of special alumina and $MgCl_2$ previously treated with ethyl benzoate, is impregnated with $TiCl_4$ to form the catalyst. The catalysts obtained have high activity, making it possible to avoid, in the resins obtained, the stage of removal of metallic residues and chlorides. The polymers obtained also have different types of molecular weight distribution and, consequently, different mechanical properties.

Document PI 9301438-4 (Jaime C. da Silva and Cecilia Maria C. de Figueiredo) describes a process for preparing a spherical support for polymerization of alpha olefins from an ammoniacal dawsonite, which is spray-dried, forming spherical particles which, by calcination and impregnation with titanium, produce a catalyst that is also spherical and has good mechanical strength. The document also describes the polymerization process, which, in the presence of the spherical catalyst, produces particles of polyolefins that maintain the sphericity of the support with low angle of draining and good apparent density, as well as polyethylene the product obtained from the described process.

Document PI 0304322-3 (Dellyo Ricardo dos S. Alvares and Roberto B. Haag) describes a process for obtaining polyethylene fibber of high modulus, extrudable, comprising melting and stretching, in conventional equipment, of polyethylene obtained by polymerization of ethylene in the presence of a Ziegler-Natta catalyst on a mixed support of alumina and magnesium chloride in which the proportions of magnesium chloride vary between 15 wt. % and 60 wt. %, and the ethylene/$H_2$ ratio between 6.0 and 1.2, the variation of these two parameters leading to "classes" of polyethylene with different distributions of molecular weight and different flow indices, offering the possibility of transformation to fibbers of high modulus.

SUMMARY OF THE INVENTION

The present invention relates to a process for obtaining a catalyst intended for the production of polyolefins, more particularly a catalyst of high activity based on a mixture of supports, more specifically, a mixture of supports of $Al_2O_3$ and $MgCl_2$.

The catalyst obtained according to the process of the present invention has a controlled morphology as well as a catalytic activity compatible with industrial systems, and greater versatility, so that it can be used with any technological platform, both in plants operating in batch mode by the slurry (slurry/bulk) system or in plants with a gas-phase system. In the case of gas-phase systems the requirements relating to particle morphology and catalyst performance are much more strict, particularly with respect to apparent density.

The catalyst of the present invention involves the use of a spherical support based on special alumina that serves as a porous matrix. In this porous matrix of $Al_2O_3$ is, made by precipitation, a magnesium chloride intrusion by means of a solubilisation in ethers and/or alcohols.

From the industrial point of view, the catalyst of the present invention is more controllable, beyond propitiating a comparable or even a superior catalytic productivity to the productivity obtained using catalysts obtained by grinding.

The catalyst of the invention was also tested in the polymerization of propylene and in copolymerization with α-olefins.

DETAILED DESCRIPTION OF THE INVENTION

The present invention relates to a process for obtaining a catalyst intended for the production of polyolefins, more particularly a catalyst of high activity based on a mixture of specially prepared $Al_2O_3$ and $MgCl_2$ supports.

The preparation of catalyst supports based on alumina (or silica) and magnesium chloride is described in various documents in the specialized literature, and combination of the two substances to form the support can be effected in different ways.

The catalyst of the present invention employs a spherical support based on alumina, obtained by the technique described in the applicant's document PI 9301438-4 A and cited as reference, where this support is modified by means of a mixture of said special alumina with variable amounts of magnesium chloride previously dissolved in ethers or alcohols, in such a way that, as the amount of magnesium halide added is varied, the other components of the catalytic system are kept constant.

With this, the following are modified: the catalytic activity, the molecular weight and molecular weight distribution of the polyolefin, product of the polymerization reaction, with consequent variation of its mechanical properties.

In another aspect, the present invention improves the characteristics of the catalytic Ziegler system, described in the applicant's document PI 8005670-9, also cited as reference.

In the present invention, as already mentioned, the catalyst is formed by the intrusion of an adduct of magnesium chloride in a porous matrix of special alumina, called porous matrix of special spherical alumina.

The adduct is incorporated by dissolving the magnesium chloride and incorporating it in the porous matrix of special spherical alumina by controlled precipitation. A suspension is formed in a solvent, alcohol or ether, which, by evaporation, it generates a spherical matrix of alumina impregnated with the adduct of magnesium chloride in its pores. The content of $MgCl_2$ varies in a range from 3 wt% to 50 wt%. In the present embodiment the solvent used is an alcohol.

Among the ethers that can be used include alkyl ethers and cycloalkyl ethers such as diethyl ether, di-n-propyl ether, dibutyl ether, tetrahydrofuran, and dioxane, among others.

Among the alcohols that can be used include alkyl alcohols with 1 to 12 carbon atoms.

The compound obtained then undergoes a chemical desolvation by treatment with an alkyl aluminium, and then titanation to obtain the catalyst.

The alkyl aluminiums that can be used include trimethyl aluminium, triethyl aluminium, tri-isobutyl aluminium, diethyl aluminium chloride, tri-n-hexyl aluminium, isoprenyl aluminium and mixtures of these alkyl aluminiums.

The process for obtaining the catalyst of the present invention comprises the following stages:

a) preparation of a support using a technique that comprises the following steps: prepare a solution of $MgCl_2$ by weighing a defined amount of $MgCl_2$ relative to the mass of alumina weighed; slowly add this mass of $MgCl_2$ to the cooled solvent, selected from alcohols and ethers mentioned above, under a stream of inert gas and, vigorous stirring and then apply heating and stirring to facilitate the dissolution;

prepare the mixture of alumina and $MgCl_2$ in solution by adding the solvent to the alumina under a stream of inert gas; then add the solution of $MgCl_2$ with vigorous stirring and then heat so that the excess solvent evaporates, leaving a dry powder;

treat the mixture of alumina and $MgCl_2$ in a system equipped with mechanical stirring to obtain a suspension of this mixture in a hydrocarbon in the range from $C_5$ to $C_{12}$; slowly add an alkyl aluminium to the suspension and continue stirring for a specified contact time; remove the excess hydrocarbon; carry out successive washings, then at the end of washing, filter the treated support and dry it under a stream of inert gas;

b) carry out synthesis of the catalyst, observing the following stages:

add the support obtained in the preceding stage to titanium chloride in the interior of a titanation reactor with washing cycles;

start a slow and a gradual heating to a pre-established temperature, always under stirring and for a specified time, at the end of which the catalyst is washed with a hydrocarbon in the range from $C_5$ to $C_{12}$ in two temperature steps, the second being at room temperature; and dry under fluidization and at temperature above room temperature with inert gas until the product be with aspect of free-flowing.

In the stage of catalyst preparation, the inert gas is preferably argon or nitrogen, the solvent used for dissolution of the $MgCl_2$ is an alcohol or ether and alkylation is carried out with an alkyl aluminium or mixture of alkyl aluminiums.

The defined amount of $MgCl_2$, considers the solubility of $MgCl_2$ in the solvent to have a value "1", and is calculated according to the following relation:

$$m_{MgCl_2} = \frac{r \times m_{Alumina}}{1-r}$$

Where: $m_{MgCl2}$=mass of $MgCl_2$ to be weighed;
r=weight ratio of $MgCl_2$ in relation to the final mixture (or percentage defined/100);
$m_{Alumina}$=mass of alumina weighed.

In the stage of preparation of the solution of $MgCl_2$, the temperature of dissolution of $MgCl_2$ in the solvent is raised to a temperature in the range from 60° C. to 90° C.

In the alkylation stage, the amount of alkyl aluminium added corresponds approximately to a rate of $2\times10^{-1}$ to $10\times10^{-1}$ mmol/g of support, the period of time for addition of the alkyl aluminium must be greater than 10 minutes, and after completion of addition the duration of contact under stirring is at least 30 minutes and at most 360 minutes. After this period, the washing of the support are carried out in 5 cycles.

In the stage of catalyst synthesis, the addition of the support is made on $TiCl_4$ at a temperature between –5° C. and 30° C.

In the stage of catalyst synthesis, the gradual heating at the end of addition of $TiCl_4$ is in the range from 30° C. to 130° C. and titanation is preferably carried out at a temperature from 80° C. to 120° C. for a set time of 2 hours.

In the stage of catalyst synthesis, the catalyst is washed with a hydrocarbon in the range from $C_5$ to $C_{12}$.

The number of washing cycles will be determined by the residual content of chlorides in the hydrocarbon.

In the stage of catalyst synthesis, the drying for fluidization in inert atmosphere is carried out at a temperature below 100° C.

Other methods of drying can be used such as vacuum drying or using a rotary evaporator.

Purely for the purpose of illustrating the invention, some experimental results will be presented below as an example. It is obvious, however, that such examples cannot be considered as limiting the invention.

Table 1 shows the characterization of the catalysts used with respect to the content of titanium:

TABLE 1

| Catalyst | Method of mixing | Titanium content (%) |
|---|---|---|
| CAT-1 | Grinding | 1.0 |
| CAT-2 | Controlled precipitation | 1.1 |
| CAT-3 | Controlled precipitation | 0.5 |
| CAT-4 | Controlled precipitation | 4.1 |

The following Tables 2 and 3 show some polymerizations for obtaining high-density polyethylene and the main characteristics of the products obtained.

TABLE 2

| | | POLYMERIZATIONS OF ETHYLENE | | | | |
|---|---|---|---|---|---|---|
| Reaction | Catalyst | % $MgCl_2$ in mixture | Alkylation | Activity* (kg/g catalyst) | MFI (g/10') | $D_{ap}$ (g/mL) |
| 1 | CAT-1 | 20-50 | no | 1.11 | 1.71 | 0.19 |
| 2 | CAT-2 | 3-15 | no | 0.41 | 0.88 | 0.30 |
| 3 | CAT-3 | 3-15 | Yes | 2.31 | 1.42 | 0.35 |
| 4 | CAT-4 | 15-25 | Yes | 20.00 | 1.0 | 0.30 |

*Polymerization conditions: $P_{C2H4}$ = 10 bar; $P_{H2}$ = 1.1 bar; T = 85° C., 2 hours.

TABLE 3

| | | POLYMERIZATIONS OF ETHYLENE | | | MOLECULAR WEIGHT DISTRIBUTION | | |
|---|---|---|---|---|---|---|---|
| Reaction | Catalyst | % $MgCl_2$ in mixture | Alkylation | Catalytic activity ($kg_{pol}/g_{cat}$) | GPC Mw | PD | % > $10^6$ |
| 1 | CAT-1 | 20-50 | no | 1.11 | 348.140 | 5.6 | 7.2 |
| 2 | CAT-2 | 3-15 | no | 0.41 | 429.226 | 6.5 | 4.1 |
| 3 | CAT-3 | 3-15 | yes | 2.31 | 270.247 | 6.9 | 5.2 |
| 4 | CAT-4 | 15-25 | yes | 20.00 | 261.543 | 5.3 | 7.6 |

*Polymerization conditions: $P_{C2H4}$ = 10 bar; $P_{H2}$ = 1.1 bar; T = 85° C., 2 hours.
Where: MFI - Melt Flow Index - ASTM D 1238 (190° C./21.6 kg).
$D_{ap}$ - Apparent density - ASTM 1895.
GPC - Gel permeation chromatography - ASTM 5296-97 and ASTM 6474-99.
% > $10^6$ - Percentage of molecules with molecular weight above 1 million.
PD - Polydispersion.
The catalyst CAT-1 was prepared by the method of mixing of the supports by grinding as described in patents PI 8703935 and PI 8801441-A Analysis of the data in Table 1 confirms that all the catalysts developed in accordance with this new method (exemplified as CAT-2, CAT-3 and CAT-4) display a significant improvement in the morphology of the polymer obtained as demonstrated by the data for $D_{ap}$ (apparent density), with values above 0.30 g/mL compared with CAT-1, obtained by grinding, which has a value of $D_{ap}$ equal to 0.19 g/mL. The high apparent density obtained makes the catalyst suitable for use in various technological platforms: slurry polymerization, bulk polymerization and gas-phase polymerization.

On comparing catalyst CAT-3 with CAT-1 and CAT-2, another important aspect of the method is confirmed, relating to alkylation of the support.

It is known that $MgCl_2$ is the support that promotes production of catalysts with higher catalytic activity. As its content is higher in CAT-1 it was to be expected that the catalytic activity of CAT-1 would be higher. However, CAT-3 presents the double of the activity of CAT-1. Furthermore, there is also even greater improvement in apparent density of the polymer, reaching the value of 0.35 g/mL.

Table 4 given below shows the results for tenacity of the polymer obtained according to the catalyst used: HMPEX "class" of polyethylene with $MFI_{190° C./21.6 kg}$ of approximately 1.5 g/10 min.

TABLE 4

| Type | MFI (g/10 min) | Extension ratio | Tenacity (g/den) |
|---|---|---|---|
| Grinding | 1.5 | 1:8 | 7.1 |
| Spherical | 1.4 | 1:8 | 7.2 |

Where:
MFI - Melt Flow Index - ASTM D 1238 (190° C./21.6 kg).
Tenacity - ASTM D 2256-02.

The data in Tables 3 and 4 provide evidence of the advantage of obtaining HMPEX by means of the present invention, in which there is a catalyst with higher catalytic activity and which promotes production of the same special polyethylene as confirmed by the data from GPC and for tenacity.

The catalyst of the present invention, as already mentioned, offers great versatility of application and, to confirm its performance, tests were carried out that involved co-polymerization of ethylene with other α-olefins for the production of linear low-density polyethylenes.

Tests were also carried out for polymerization using propylene, as well as comparative tests with equivalent commercial products.

Example of Copolymerization with 1-Butylene—Production of Lldpe (Linear Low-Density Polyethylene).

The catalyst developed was tested in the copolymerization of ethylene with 1-butylene. When using CAT-4, and using a molar ratio $C^=_2/C^=_4$ equal to 35, at temperature of reaction of 85° C., a polymer was obtained that will be designated hereinafter as POL1, with density of 0.92 g/cm³. POL1 was compared with commercial linear low-density polyethylenes (LLDPE) of the same density for assessing the mechanical properties. Commercial samples COM-1, linear low-density polyethylene based on 1-hexene and COM-2, linear low-density polyethylene based on 1-butylene, were used.

It was found that the copolymer obtained has superior mechanical properties when compared with the products of the same commercial classification.

Tables 5 and 6 given below present the results of tests performed for comparing the mechanical properties between the commercial samples COM-1 and COM-2 mentioned above and the polymer prepared according to the process of the invention POL1.

TABLE 5

| Material | TR (MPa) | DR (%) | TE (MPa) |
|---|---|---|---|
| COM-1 | 6.45 ± 0.74 | 79.91 ± 8.81 | 12.31 ± 0.29 |
| COM-2 | 15.81 ± 1.35 | 313.17 ± 28.78 | 10.31 ± 0.31 |
| POL1 | 15.59 ± 1.24 | 204.67 ± 25.71 | 17.22 ± 0.57 |

TABLE 6

| Material | DE (%) | MY (MPa) |
|---|---|---|
| COM-1 | 18.67 ± 0.80 | 252 ± 11 |
| COM-2 | 19.12 ± 1.67 | 203 ± 16 |
| POL1 | 13.95 ± 1.57 | 448 ± 40 |

Where:
TR - tension at rupture, ASTM D-638.
DR - deformation at rupture, ASTM D-638.
TE - tension at flow, ASTM D-638.
DE - deformation at flow, ASTM D-638.
MY - Young's modulus, ASTM D-638.
COM-1 - "class" of LLDPE based on 1-hexene.
COM-2 - "class" of LLDPE based on 1-butylene.
POL1 - "class" of LLDPE obtained.

The comparison of opacity was only carried out with the sample of COM-2, which being treated as an equivalent sample in terms of density, and using the same comonomer (1-butylene), has the same classification. The results are presented in Table 7, given below.

The opacity, or the Haze Test, is an important test when it is a question of using the material as a film, as it has a direct bearing on the transparency of the product, an important property in the case of packaging.

TABLE 7

| Sample | Density (g/cm³) | Opacity (%) |
|---|---|---|
| BF 220008 S3 | 0.92 | 82.04 |
| POL1 | 0.923 | 68.85 |

*Opacity - ASTM E-313-00

Example of Polymerization of Propylene

The reactions of polymerization of propylene with CAT-4, carried out by slurry polymerization, at 70° C., promoted the production of a polypropylene which, in the case of the "class" with MFI=18 g/10 min, presented a fraction of extremely high molecular weight, of the order of 5 to 7×10$^6$. The results are presented in Table 8, shown below.

TABLE 8

POLYMERIZATIONS OF PROPYLENE

| Reaction | Catalyst | % MgCl$_2$ in mixture | Catalytic activity (kg$_{pol}$/g$_{cat}$) | MOLECULAR WEIGHT DISTRIBUTION | | |
|---|---|---|---|---|---|---|
| | | | | GPC Mw | PD | % > 10$^6$ |
| 5 | CAT-3 | 3-15 | 0.05 | 106875 | 5.7 | 0.7 |
| 6 | CAT-4 | 15-25 | 0.40 | 233067 | 9.9 | 1.4 |

*Polymerization conditions: P$_{C3H6}$ = 10 bar; P$_{H2}$ = 0.5 bar; T = 70° C., 2 hours.

Although the present invention has been described in its preferred embodiment, the principal concept that guides the present invention, which is a process for the production of a catalyst for the production of polyolefins, more particularly a catalyst of high activity based on a mixture of supports, more specifically, the mixture of supports being Al$_2$O$_3$ plus MgCl$_2$, is still preserved as to its innovative character, while a person skilled in the art can envisage and implement variations, modifications, changes, adaptations and the like, conceivable and compatible with the working medium in question, without, however, departing from the scope and spirit of the present invention, which are represented by the claims given hereunder.

The invention claimed is:

1. A process for obtaining a catalyst of high activity, the process comprising the following steps:
    a) preparation of a support using a method that comprises the following steps: prepare a solution of MgCl$_2$ by weighing a defined amount of MgCl$_2$ relative to a mass of alumina weighed; slowly add this mass of MgCl$_2$ to a cooled solvent, under a stream of inert gas and stirring vigorously, and then apply heating and stirring to facilitate dissolution;
    prepare a mixture of alumina and MgCl$_2$ in solution by adding solvent to the mass of alumina until it is saturated to a slight excess, under a stream of inert gas; then add the solution of MgCl$_2$ with vigorous stirring and then heat so that the excess solvent evaporates, leaving a dry powder;
    treat the mixture of alumina and MgCl$_2$ in a system equipped with mechanical stirring to obtain a suspension of this mixture in a hydrocarbon in a range from C$_5$ to C$_{12}$; slowly add an alkyl aluminum to the suspension and continue stirring for a specified contact time thus conducting support treatment;
    at the end let it rest to settle and remove the hydrocarbon supernatant by siphoning; carry out washings, repeating the steps of stirring, settling and siphoning, then when conclude the washing, the support is filtered and dried under a stream of inert gas;
    b) carry out catalyst synthesis, observing the following steps: add the support obtained in the preceding step to titanium chloride in a titanation reactor with washing cycles for removal of unwanted products;
    start slow and gradual heating to a pre-established temperature, always with stirring and for a specified time, at the end of which the catalyst is washed with a hydrocarbon in the range from C$_5$ to C$_{12}$ in two temperature steps, the second being at room temperature; and
    dry with fluidization and at temperature above room temperature with inert gas until a product is free-flowing.

2. The process according to claim 1, wherein the inert gas is argon or nitrogen, the solvent is selected from the group consisting of an alkyl alcohol with 1 to 12 carbon atoms and an ether selected from alkyl ethers and cycloalkyl ethers, and alkylation is performed with alkyl aluminium or mixtures of alkyl aluminium selected from trimethyl aluminium, triethyl aluminium, diethyl aluminium chloride, tri-isobutyl aluminium, and isoprenyl aluminium in the steps of catalyst preparation.

3. The process according to claim 1, wherein a temperature of dissolution of $MgCl_2$ in the solvent is raised to a temperature in the range from 60° C. to 90° C. in the step of preparation of the solution of $MgCl_2$.

4. The process according to claim 1, wherein in the step of alkylation, the amount of alkyl aluminium added corresponds, approximately, to a molar ratio from $2 \times 10^{-1}$ to $10 \times 10^{-1}$ mmol/g relative to the support, a period of time for addition of the alkyl aluminium must be more than 10 minutes, after completion of addition, the contact time with stirring is at least 30 minutes and at most 360 minutes and the washing operation is carried out in 5 cycles.

5. The process according to claim 1, wherein in the step of catalyst synthesis, the support is added to $TiCl_4$ at a temperature between —5° C. and 30° C., gradual heating at the end of addition of $TiCl_4$ in the range from 30° C. to 130° C., titanation is carried out at a temperature from 80° C. to 120° C. for a set time of 2 hours, a number of washing cycles is determined by the residual content of chlorides in the hydrocarbon, and drying is carried out in the reactor in an inert atmosphere for fluidization at a temperature below 100° C.

6. The process according to claim 1, wherein the solvent is selected from the group consisting of diethyl ether, di-n-propyl ether, dibutyl ether, tetrahydrofuran and dioxane.

7. The process according to claim 2, wherein the alkyl ether is selected from the group consisting of diethyl ether, di-n-propyl ether, dibutyl ether, tetrahydrofuran and dioxane.

* * * * *